United States Patent
Cohn (10) Patent No.: US 8,416,828 B2
(45) Date of Patent: Apr. 9, 2013

(54) CATALYST MODULE FOR HIGH REPETITION RATE $CO_2$ LASERS

(75) Inventor: David B. Cohn, Torrance, CA (US)

(73) Assignee: DBC Technology Corp., Torrance, CA (US)

( * ) Notice: Subject to any disclaimer, the term of this patent is extended or adjusted under 35 U.S.C. 154(b) by 312 days.

(21) Appl. No.: 12/901,260

(22) Filed: Oct. 8, 2010

(65) Prior Publication Data
US 2012/0087388 A1    Apr. 12, 2012

(51) Int. Cl.
*H01S 3/22* (2006.01)
(52) U.S. Cl. .......................... 372/59; 372/55
(58) Field of Classification Search ............... 372/55–59
See application file for complete search history.

(56) References Cited

U.S. PATENT DOCUMENTS

| | | | | |
|---|---|---|---|---|
| 4,837,770 | A | * | 6/1989 | Koop ............................ 372/59 |
| 5,590,146 | A | * | 12/1996 | von Borstel .................... 372/58 |
| 5,841,804 | A | * | 11/1998 | Toshikuni et al. ............. 372/59 |

FOREIGN PATENT DOCUMENTS

JP    01196883 A  *  8/1989

OTHER PUBLICATIONS

Willis, C., et al., Catalytic Control of the Gas Chemistry of Sealed TEA C02 Lasers, pp. 2539-2543, vol. 50, No. 4, Apr. 1979, J. Appl. Phys. Apr. 1979, American Institute of Physics, College Park, Maryland, USA.
Lewis, Paul, et al., Catalyst Selection for Rep-pulsed High Power Self-Sustained Discharged CO2 Laser, pp. 385-395, Proceedings Paper, Mar. 29, 1996, SPIE vol. 2702, Bellingham, WA, USA.
Stark, D.S., et al., A Sealed 100-Hz CO2 TEA Laser Using High CO2 Concentrations and Ambient-Temperature Catalysts, vol. 16, No. 2, 1983, Journal Phyics E: Scientific Instruments, Bristol, UK.
Willis, C., et al., Use of 13CO2 in High-Power Pulsed TEA Lasers, pp. 1141-1143, Rev. Sci. Instrum 50(9) Sep. 1979, American Institute of Physics, College Park, Maryland, USA.

* cited by examiner

Primary Examiner — Jessica Stultz
Assistant Examiner — Phillip Nguyen
(74) Attorney, Agent, or Firm — Boyle Fredrickson, S.C.

(57) ABSTRACT

An array of discrete catalyst elements is contained in a heated module external to the main laser vessel with an auxiliary gas flow loop connecting them so as to provide independent control of catalyst temperature and gas flow rate to achieve high $CO + 1/2 O_2$ to $CO_2$ recombination under high pulse repetition frequency operation for a sealed laser. Catalyst elements in the form of cylinders with holes through their centers are mounted on multiple parallel rods or catalysts in the form of small spherical or cylindrical elements are contained in multiple packets arranged in the module so as to minimize flow impedance and maximize laser gas recycling throughput. The cylindrical catalyst module is constructed so as to allow for rapid heating to operating temperature while withstanding atmospheric differential pressures during laser processing.

4 Claims, 6 Drawing Sheets

CATALYST MODULE FOR HIGH REPETITION RATE $CO_2$ LASERS

STATEMENT REGARDING FEDERALLY SPONSORED RESEARCH OR DEVELOPMENT

-

CROSS REFERENCE TO RELATED APPLICATION

-

BACKGROUND OF THE INVENTION

This invention relates to the $CO_2$ gas laser and in particular to the high pulse repetition rate, high pressure transverse discharge type.

The $CO_2$ gas laser requires a plasma glow discharge to excite the lasing species which then generates laser radiation by stimulated emission. In addition to providing the laser excitation energy, the glow discharge also acts negatively to dissociate the $CO_2$ gas into its constituent CO and $O_2$ parts. These constituents are essentially chemically stable and by themselves do not reform into $CO_2$ over timescales of interest in normal application. The result is a depletion of the $CO_2$ lasing species and a buildup of CO and $O_2$ in the laser gas which leads to a loss of laser power and a tendency to discharge arcing. Discharge arcing is the phenomenon in which the glow discharge collapses into hot, narrow channels seriously degrading laser output energy and beam uniformity. In general, there are two types of $CO_2$ laser, those that operate at relatively low gas pressure on the order of 20 Torr and those that operate at much higher pressures on the order of one atmosphere or 760 Torr. The discharge in a low pressure $CO_2$ laser is normally of the continuous wave (cw) type; whereas, the high pressure discharge is of the Transverse Electric Atmospheric (TEA) short pulse type. Low pressure glow discharges induce a relatively low rate of $CO_2$ dissociation; and high pressure discharges, especially at high pulse repetition frequencies, lead to rapid loss of $CO_2$ and generation of $O_2$. Even relatively low levels of $O_2$ on the order of about 1% can lead to arcing in high pressure discharges.

In order to control the loss of $CO_2$ in low pressure lasers, a continually fresh gas flow into the laser and exhaust of depleted gas can be used in some applications in which the presence of a large feed gas reservoir is acceptable. Another approach for low pressure sealed $CO_2$ lasers is gas catalysis in which certain gas additives can be used to promote $CO_2$ regeneration, but regeneration by this method operates at a relatively low rate. In the case of the high pressure TEA $CO_2$ laser, the method of fresh gas replacement would require prohibitively large amounts of gas; and the regeneration rates by gas catalysis are too low, especially for compact lasers with small gas volumes and high specific energy discharges.

Alternatively for the high pressure TEA $CO_2$ laser, an effective method to control gas decomposition and maintain discharge stability is with a highly active, solid state discrete $CO+1/2O_2$ to $CO_2$ regeneration catalyst which can be implemented in a completely sealed laser system with a single charge of gas. Such catalyst is also applicable to the low pressure $CO_2$ laser for situations in which continual gas flow replenishment is not feasible or where gas catalysis becomes unreliable over very long operating periods. For both low and high pressure lasers, a discrete solid state regeneration catalyst in a sealed laser gas vessel would be desirable when using a gas mixture with various expensive rare isotopes such as $^{13}C^{16}O_2$ which are often employed to generate additional laser wavelengths beyond those available from the commonly occurring isotope $^{12}C^{16}O_2$.

The discrete solid state catalyst can take several different forms, including small spheres or rods of approximately 3-5 mm diameter and disks of approximately 15 mm diameter. The small rods and spheres are suitable for high surface area pebble bed catalyst modules, but they induce very high pressure drops in high flow rate gases typical of high power laser systems; whereas, the disks can be placed separately in the flow stream for low flow impedance but at the expense of reduced total catalyst surface area. For these catalysts, it is the combination of intrinsic catalyst chemical reactivity in combination with surface area that determines net total catalyst effectiveness. U.S. Pat. Nos. 4,943,550 and 5,017,357 teach how such catalysts are fabricated by applying thin layers of platinum compounds to ceramic substrates. Several basic catalyst types have been described and compared in Lewis, "Catalyst Selection for a Rep-Pulsed High Power Self-Sustained Discharge $CO_2$ Laser", SPIE 2702, 385 (1996). Whatever the catalyst geometry, they are all coated with a thin layer of active catalytic material which is loosely bound to the underlying inert substrate, and as a consequence they all liberate dust when handled or rubbed together. The dust particles eventually find their way to the laser vessel windows where they deposit forming sites for ablation in the highly intense intracavity laser resonator optical beam. The ablation sites cause damage to the window optical surfaces leading to increasing disruption of the laser optical mode and decrease in output power over time. Optical damage is a major laser lifetime limiting effect.

The effectiveness of discrete catalysts depends on two other important factors, their temperature and the flow rate of gas through them. Catalytic activity itself increases markedly with increasing temperature, roughly doubling with every 50 C rise in temperature. The rate of $CO+1/2O_2$ to $CO_2$ regeneration depends upon the rate at which decomposed gas is recycled through the section of the laser containing the catalyst. These two factors plus the acceptable catalyst volume that can be set aside in the laser design are balanced against the $CO_2$ decomposition rate which is dependent on the strength of the discharge, pulse energy and pulse repetition frequency in the case of the $CO_2$ TEA type.

The $CO_2$ TEA laser is characterized by fast transverse gas flow across two long parallel electrodes between which the short pulse glow discharge is initiated. The gas velocity is about 6 m/s to 12 m/s for 1 cm wide electrodes with a discharge pulsing at a 200-400 Hz rate, which repetition rates are required for many applications. The gas flows in a recirculating pattern, alternately passing across the electrodes and through a heat exchanger. The motive force for the gas flow is provided by a fan extending the full length of the electrodes. This basic geometry is described in U.S. Pat. Nos. 4,099,143 and 4,686,680. Incorporation of a catalyst module in the basic TEA laser geometry can be achieved by placing the module within the main flow loop or in an auxiliary gas flow arm outside of it. Placed within the main gas flow, the catalyst module will induce an impedance to the main flow which will become more severe as the amount and density of catalyst is increased. For a module placed within the main gas flow stream, it is also not desireable to heat the catalyst to increase activity because such heating will elevate the average temperature of the surrounding lasing gas thereby reducing laser gain and efficiency. A rise in gas temperature from 21 to 30 C causes roughly a factor of two reduction in output energy. One approach to reducing the effective gas flow impedance imposed by the catalyst module is to place it adjacent to the walls of the main gas flow stream and direct only a portion of the main gas stream through the catalyst; but the catalyst module then becomes much less effective, as most of the gas bypasses it, and the result is a significant reduction of the maximum allowable discharge pulse repetition frequency. This side-wall implementation has been described in D. S. Stark, et al. "A sealed 100-Hz $CO_2$ TEA laser using high $CO_2$ concentrations and ambient temperature catalyst", J. Phys. E: Sci. Instrum., Vol. 16, 158-161 (1983).

The implementation of a catalyst module in an external flow loop is described in Willis and Purdon, "Catalytic Control of the Gas Chemistry of Sealed TEA $CO_2$ Lasers", J. Appl. Phys. 50 (4) April 1979 and Willis, et al., "Use of $^{13}CO_2$ in high-power pulsed TEA lasers", Rev. Sci. Instrum., 50, 1141-1143 (1979). These publications describe catalyst modules with no particulate control and with low flow rates and low net recombination activity that can support relatively low 2.5 Hz pulse repetition frequencies. The publication by Lewis makes mention of efforts to develop an auxiliary flow loop catalyst module; but no details, diagrams or test results are given, although a maximum pulse repetition frequency of 50 Hz is indicated in a data plot. The auxiliary flow loop catalyst configuration can also be utilized with low pressure lasers.

SUMMARY OF THE INVENTION

The present inventor has recognized that the inefficiency in catalytic operation attendant to placing the catalyst outside the main flow of gas of the laser can be offset by the substantial increase in catalytic effectiveness obtainable by heating the catalyst. While this heating does increase the temperature of the gas being treated, this small amount of heating can be tolerated in the bypass stream so long as the leakage heat from the catalyst can be largely isolated.

The invention also recognizes that rapid heating of the catalyst module to operating temperature can be achieved by enclosing the catalyst elements within a low weight, low heat capacity, simply constructed, thin-walled cylindrical vessel with exterior thermal insulation. The cylindrical shape allows for evacuation of the vessel to low pressure with respect to the exterior atmospheric pressure during laser processing without deformation of the thin wall.

In another embodiment, catalyst in the form of pellets or small cylinders are placed into a number of packets covered in wire mesh with large frontal area to volume ratio and arranged separately in the gas flow stream to minimize impedance and maximize catalyst surface area contact with the gas, thereby achieving the benefits of the small element catalyst pebble bed and large element disk catalyst simultaneously.

These particular features and advantages may apply to only some embodiments falling within the claims and thus do not define the scope of the invention. The following description and figures illustrate a preferred embodiment of the invention. Such an embodiment does not necessarily represent the full scope of the invention, however. Furthermore, some embodiments may include only parts of a preferred embodiment. Therefore, reference must be made to the claims for interpreting the scope of the invention.

DESCRIPTION OF THE PREFERRED EMBODIMENT

Figure 1:
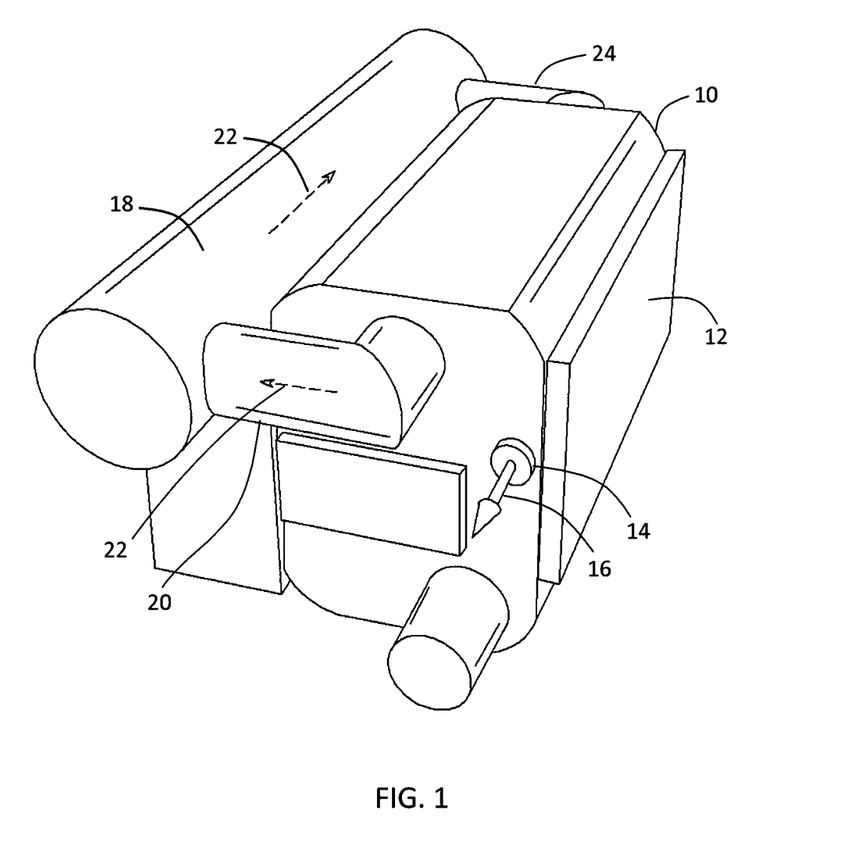
FIG. 1 is a perspective view of the cylindrical catalyst module attached to a $CO_2$ TEA laser.

Referring to FIG. 1 of the drawings, there is shown a $CO_2$ TEA laser vessel 10 with vessel cover 12, optical window 14, and output laser beam 16. A large diameter auxiliary flow tube 20 connects the laser vessel to a cylindrical catalyst module 18 at one end and a similar flow tube 24 connects to the laser vessel at the other end, both allowing for gas flow 22 from the laser vessel through the catalyst module. Narrow plasma discharge electrodes not shown in the figure extend the full length of the vessel and the inter-electrode discharge provides gas excitation power with subsequent laser emission.

Figure 2:
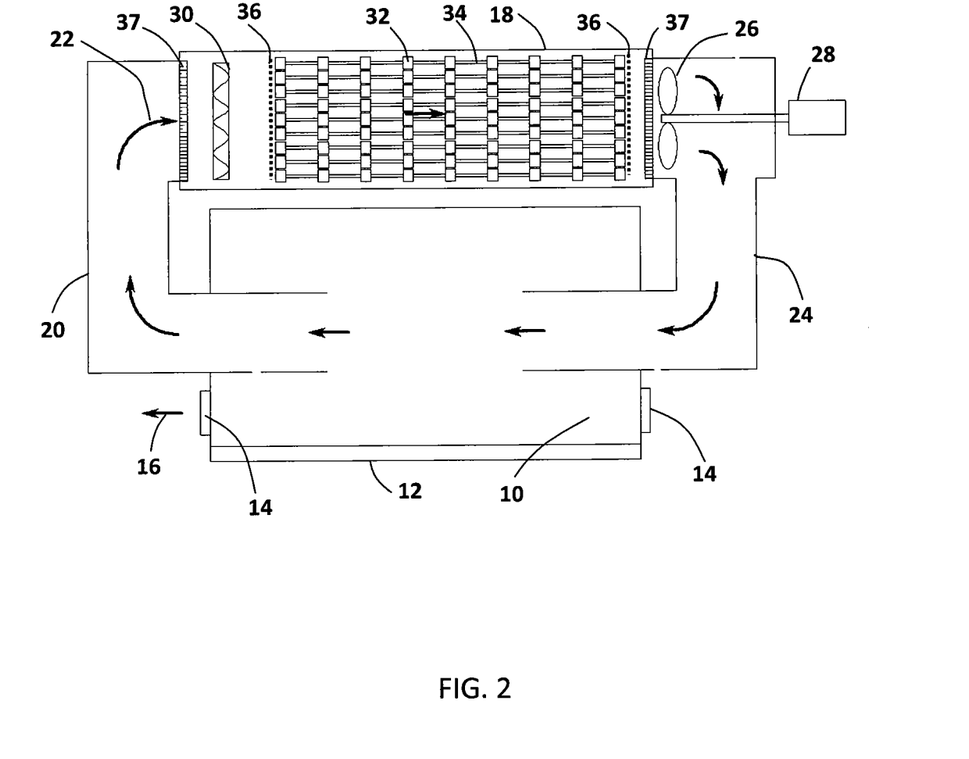
FIG. 2 is a schematic longitudinal cross-section view of the catalyst module showing placement of the catalyst module components and gas flow direction through them for the case of catalyst elements in the form of large diameter cylinders strung on parallel rods.

FIG. 2 is a longitudinal cross-sectional view of the laser and catalyst module showing the module components, the recirculating gas flow path out of the laser and into the module, and the relative location of the laser resonator optics 14 and output beam 16. A circulating gas flow pattern through the module in the direction of dotted arrows 22 is set up by the fan 26. Gas is withdrawn from the laser vessel, treated in the module to recombine $CO+1/2O_2$ to $CO_2$ and then injected back into the laser vessel where it is picked up and mixed by the main laser gas flow perpendicular to the module flow at its injection point. The gas flow rate through the laser discharge electrode region is on the order of 17,000 $cm^3/s$ for 30 cm long electrodes, 1 cm wide, separated by 1 cm, and pulsed at a 200 Hz repetition rate. Flow rates through an 11 cm diameter catalyst module are typically 500-1000 $cm^3/s$ (or less than 1/10 the gas flow through the discharge electrode region) with velocities of 5-10 cm/s; therefore, the volume rate of gas processed through the module is a small fraction of the main laser gas flow. The gas entering the module first encounters a nichrome heater wire 30 wrapped on an alumina form where the gas temperature is elevated to 40-60 C. depending upon the level of activity required. The heated gas then passes over catalyst elements 32, shown as small cylinders in the figure, which are slid onto a number of equally spaced parallel rods 34. The rods with catalyst elements are held in position by end plates 36 having a number of holes in them between the rod attachment points to allow for gas to pass through unimpeded. High temperature filter material 37 is placed at each end of the module to trap particulates generated from the catalyst coatings. Surrounding the heater and catalyst areas on the outside of the catalyst module cylinder is located a thermal insulator to limit heat loss not shown in the figure for clarity. The thermal energy imparted to the gas in the catalyst module by the nichrome heater is a small fraction of the main laser gas heating generated by the high pulse frequency of the plasma discharge, and the thermal energy from both these sources is withdrawn through the main laser heat exchanger.

In order to bring the catalyst module to its operating temperature, it is required to apply heater power for a period of time determined by the gas flow rate, heat capacity of the catalyst module components, heat loss through the external thermal insulator, and the heater wattage. The major contributor to heat capacity is the module wall; therefore, it is desirable to reduce it as much as possible taking into account the requirement that it withstand one atmosphere of inward differential pressure during laser processing and gas filling. For some applications, it is important to minimize the vessel weight. Finally, it is always desirable to minimize fabrication cost which may exclude certain machining intensive designs typically used to achieve stiff and lightweight structures. Taking all these factors into account, the preferred embodiment is a simple cylindrical aluminum vessel with wall thickness of about 1.5 mm. Given the operating parameters cited above and a cylinder length of 45 cm, the risetime to 60 C with 150 W heater power through the nichrome wire 30 is about three minutes. Heat loss through a polyurethane insulator is about 11 W, a negligible fraction of the input power and less than 10%. Another determinant of laser warmup time is the thyratron high voltage tube normally used to switch on the plasma glow discharge in the $CO_2$ TEA laser which typically takes five minutes. Certain sensors that incorporate the $CO_2$ TEA laser use sensitive detectors cooled by cryogenic engines and these can take several minutes to cool the detector dewar to the 77K operating temperature. Therefore, the cylindrical thin wall catalyst module would not be the determining factor for warmup time. Alternative catalyst vessel designs based on thick wall cylinders or rectangular geometries that require much thicker walls material to withstand differential pressure on a flat surface typically have temperature risetimes of tens of minutes which are not suitable for many applications.

Figure 3:
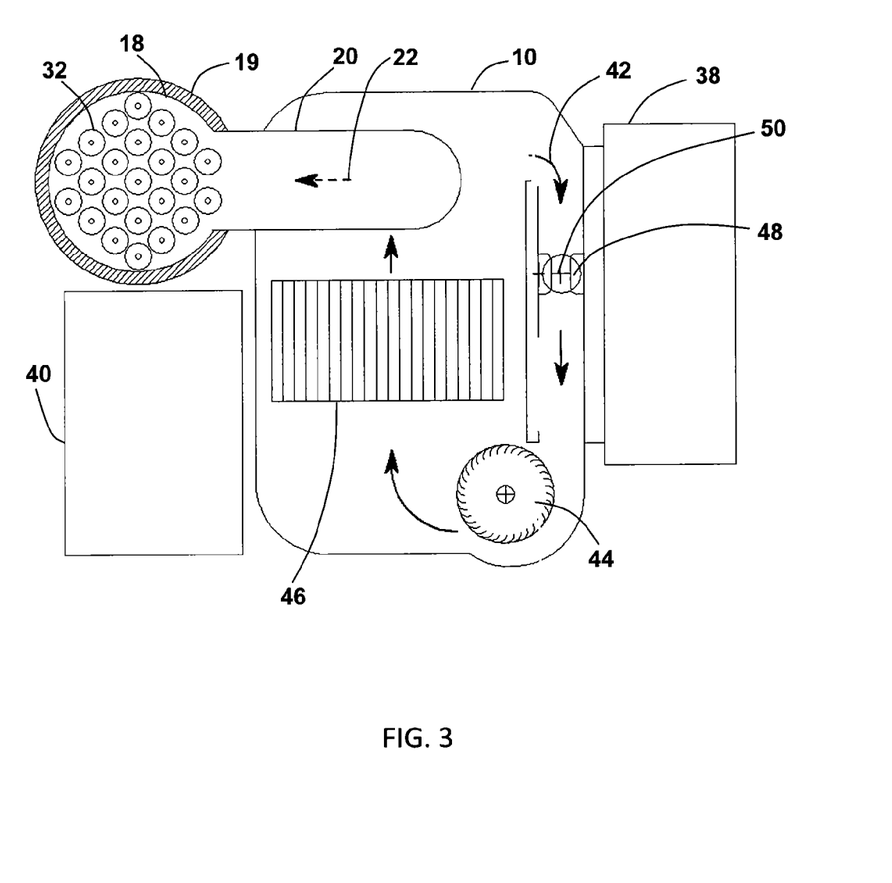
FIG. 3 is a schematic end view of the catalyst module, the internal components of the laser vessel and direction of main gas flow, the position of the discharge and optical axis, and the major laser external components.
Figure 4:
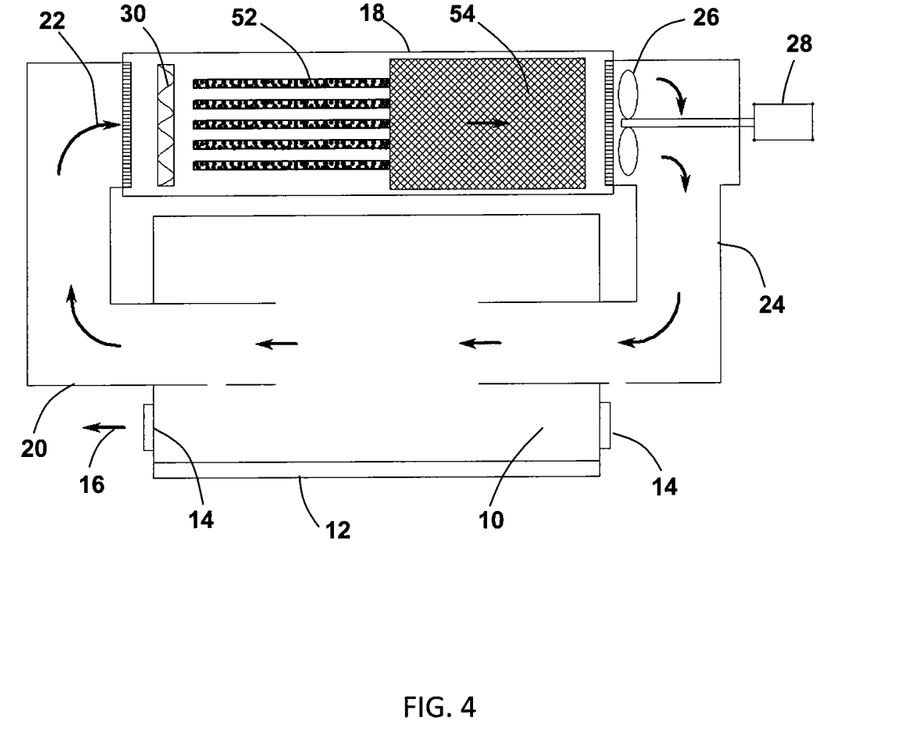
FIG. 4 is a schematic cross-section longitudinal view of the catalyst module showing the showing placement of the catalyst module components and gas flow direction through them for the case of catalyst elements in the form of rectangular packets filled with small diameter spherical catalyst elements.

FIG. 3 is an end view showing the catalyst module attachment to the laser, position of the discharge electrodes 48 and optical axis 50, major laser vessel components, and flow direction within the laser vessel. The main laser gas flow 42 is propelled by the fan 44 which causes the flow to pass alternately between the electrodes and the heat exchanger 46. A small portion of gas is cycled through the catalyst module and exits the module in a recombined state to be mixed with the main laser gas flow. The module 18 is a cylinder with circular cross-section that, because of its symmetry about the central axis, uniformly spreads the inwardly directed atmospheric pressure load when performing laser processing and gas filling. This allows for a thin wall design with low thermal mass that minimizes the risetime to catalyst operating temperature. The module is wrapped in a thermal insulator 19 to facilitate rapid rise to operating temperature. One such thermal insulator is made of lightweight 13 mm thick polyurethane. Other major components include the high voltage discharge pulser 38 and electronics module 40 which are integrated to form a compact laser package. In the illustration of FIG. 4 is shown the implementation of an array of thin rectangular catalyst packets 52 of 10 cm width by 15 cm length by 7 mm thickness and filled with small catalyst elements of 3-5 mm diameter normally used in catalyst pebble beds. The catalyst elements are shown loosely packed for purposes of illustration, but in practice they are densely packed. A parallel array of five packets is shown occupying one half of the volume reserved for the catalyst followed by another array of five packets 54 rotated by 90 degrees to the first array. The packets have metal mesh on each large surface face to contain the small catalyst elements while allowing laser gas to freely pass through. Gas flow is generally parallel to the large packet surfaces, but diffusion causes the gas to make contact with the large catalyst surface area presented. This type of catalyst arrangement is desirable because the active catalyst material resides on the surface of an inert volume substrate and the ratio of surface area to volume, which scales as the inverse of radius for spheres, favors small particles rather than larger. The problem heretofore with using small catalyst elements is that they have been used in relatively deep pebble beds with high gas flow impedance, inconsistent in catalyst module designs for the $CO_2$ TEA laser with their demand for high flow and recombination rates. The thin packet array achieves very high surface area catalyst in a low impedance geometry.

Figure 5:
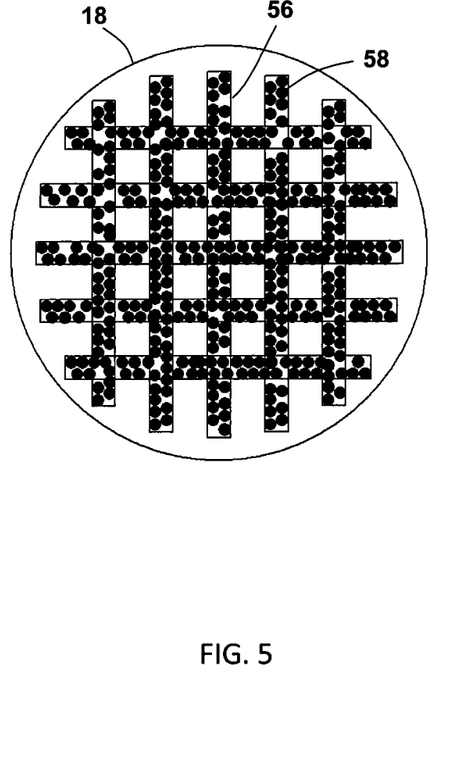
FIG. 5 is an end view of the array of catalyst packets.

FIG. 5 is an end view of the thin packet geometry with a view of both sets of packet arrays rotated 90 degrees to each other and showing the packet container 56 and small diameter catalyst elements 58, again loosely packed for purposes of illustration.

Figure 6:
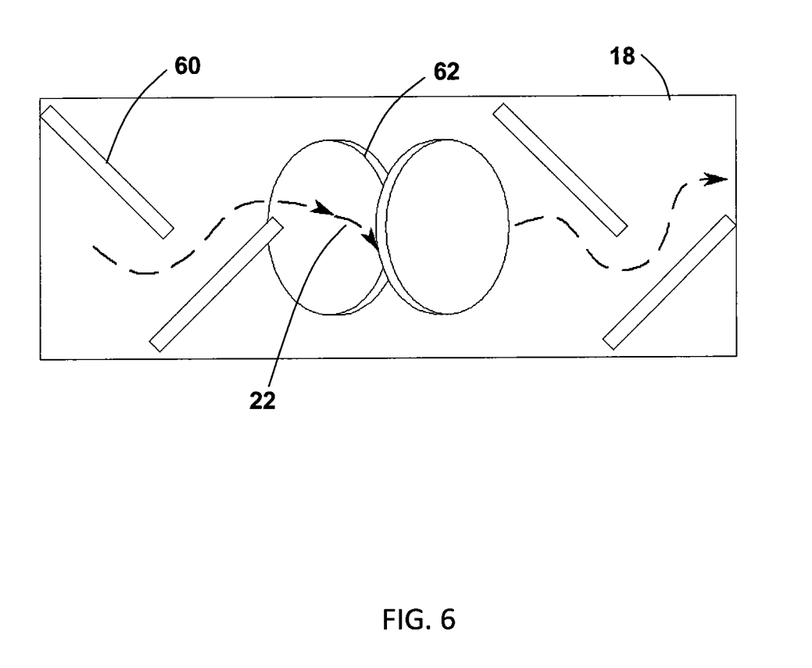
FIG. 6 is a schematic longitudinal view of an alternate form of circular packets of small diameter catalyst arrayed so as to induce a serpentine gas flow path around them.

FIG. 6 shows an alternative packet design composed of disk containers 60. The small diameter catalyst elements are not shown for clarity. The disks filled with catalyst elements are canted at an angle to the flow and subsequent pairs of disks 62 in the flow direction are rotated 90 degrees so as to require the gas flow to describe a twisting serpentine path 22 through the array. Impingement of the gas stream on the disk faces forces the gas deeper into the packed elements to achieve improved surface area contact but without inducing unacceptable flow impedance. It can be appreciated that other packet geometries and arrangements can be devised to achieve the same ends.

In summary, the alternative of placing the catalyst module within an auxiliary flow arm outside the main laser gas flow has the desirable attributes that it does not impede the main flow and allows for independent adjustment of both the temperature and flow rate of gas through the module. The module can also be configured with filters on both ends to trap particulates, and such filters do not add appreciably to the module flow impedance due to the relatively low module gas velocity. For these reasons, the auxiliary flow arm catalyst module can be configured to have a high net activity for $CO_2$ recombination especially suited for the high power $CO_2$ TEA laser with its high rate of $CO_2$ dissociation in the desirable range of 200-400 Hz pulse repetition rates. Furthermore, certain applications require that the operating temperature be reached as quickly as possible, and owing to the design options afforded by the auxiliary flow arm catalyst approach, its warmup time can be reduced to below that of other laser components and of components in sensor systems with which the laser is often integrated.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A recirculating catalyst module for a gas discharge laser providing a main gas flow stream through a laser housing past an electrical discharge region to produce a laser light, the catalyst module comprising:

a chamber positioned outside the laser housing and containing catalyst elements;

a fan to draw a portion of a laser gas from the main gas flow stream into the chamber and expel it back into the main gas flow stream;

a heater positioned to heat gas within the chamber;

a thermal insulator positioned between the chamber and ambient air and partially between the chamber and the laser housing; and at least one filter attached to at least one end of the catalyst module to contain particulates emanating from the catalyst elements wherein small diameter catalyst elements are contained in thin rectangular packets having a width, a length, a thickness, with large frontal area with respect to a flow of the portion of laser gas to increase total catalyst surface area exposed to the laser gas, wherein the small diameter is than the largest of the width, length, and thickness, and wherein the large frontal area is a largest face of the rectangular packet defined by the width, length, and thickness.

2. The recirculating catalyst module of claim 1 wherein the rectangular packets are arranged so as to present a low impedance to the gas flow.

3. The recirculating catalyst module of claim 1 wherein the packets are disks canted to a gas flow direction so as to induce penetration by a force of an impinging flow and increase a total surface catalyst area in contact with gas.

4. The recirculating catalyst module of claim 3 wherein proximate pairs of disks are rotated with respect to each other by substantially 90 degrees so as to impart a twisting serpentine path to a gas flow therebetween thereby improving gas mixing and contact with the catalyst surface.

* * * * *

UNITED STATES PATENT AND TRADEMARK OFFICE
CERTIFICATE OF CORRECTION

| | |
|---|---|
| PATENT NO. | : 8,416,828 B2 |
| APPLICATION NO. | : 12/901260 |
| DATED | : April 9, 2013 |
| INVENTOR(S) | : Cohn |

Page 1 of 1

It is certified that error appears in the above-identified patent and that said Letters Patent is hereby corrected as shown below:

In the Claims:

Col. 8, line 1-4 claim 1, should read wherein the small diameter less than the largest of the width, length, and thickness, and wherein the large frontal area is a largest face of the rectangular packet defined by Width, length, and thickness.

Signed and Sealed this
Third Day of September, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,416,828 B2
APPLICATION NO. : 12/901260
DATED : April 9, 2013
INVENTOR(S) : Cohn It is certified that error appears in the above-identified patent and that said Letters Patent is hereby corrected as shown below:

In the Claims:

Col. 8, line 1-4 claim 1, should read wherein the small diameter is less than the largest of the width, length, and thickness, and wherein the large frontal area is a largest face of the rectangular packet defined by width, length, and thickness.

This certificate supersedes the Certificate of Correction issued September 3, 2013.

Signed and Sealed this
Twenty-second Day of October, 2013

Teresa Stanek Rea
*Deputy Director of the United States Patent and Trademark Office*